Patented Aug. 21, 1934

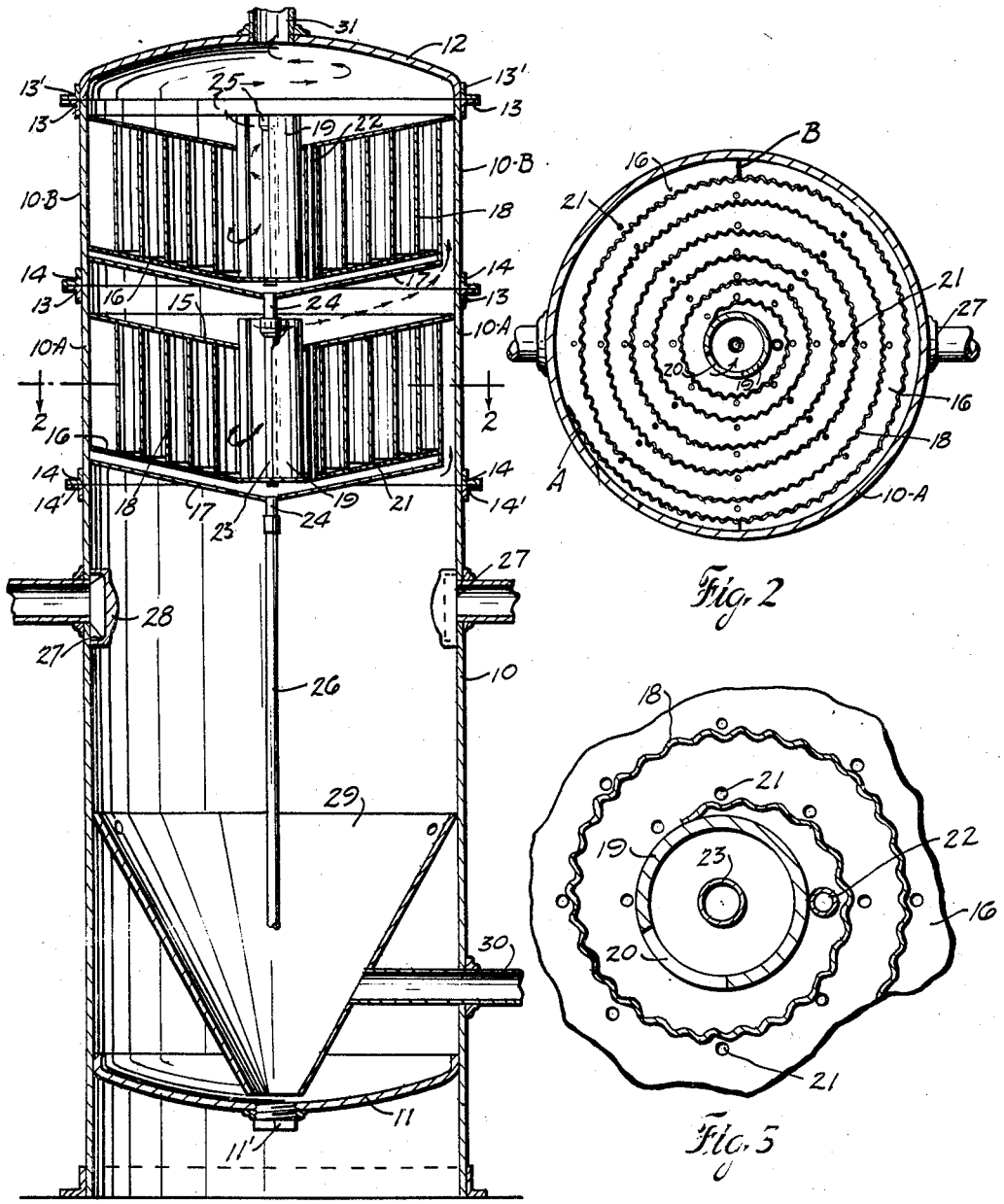

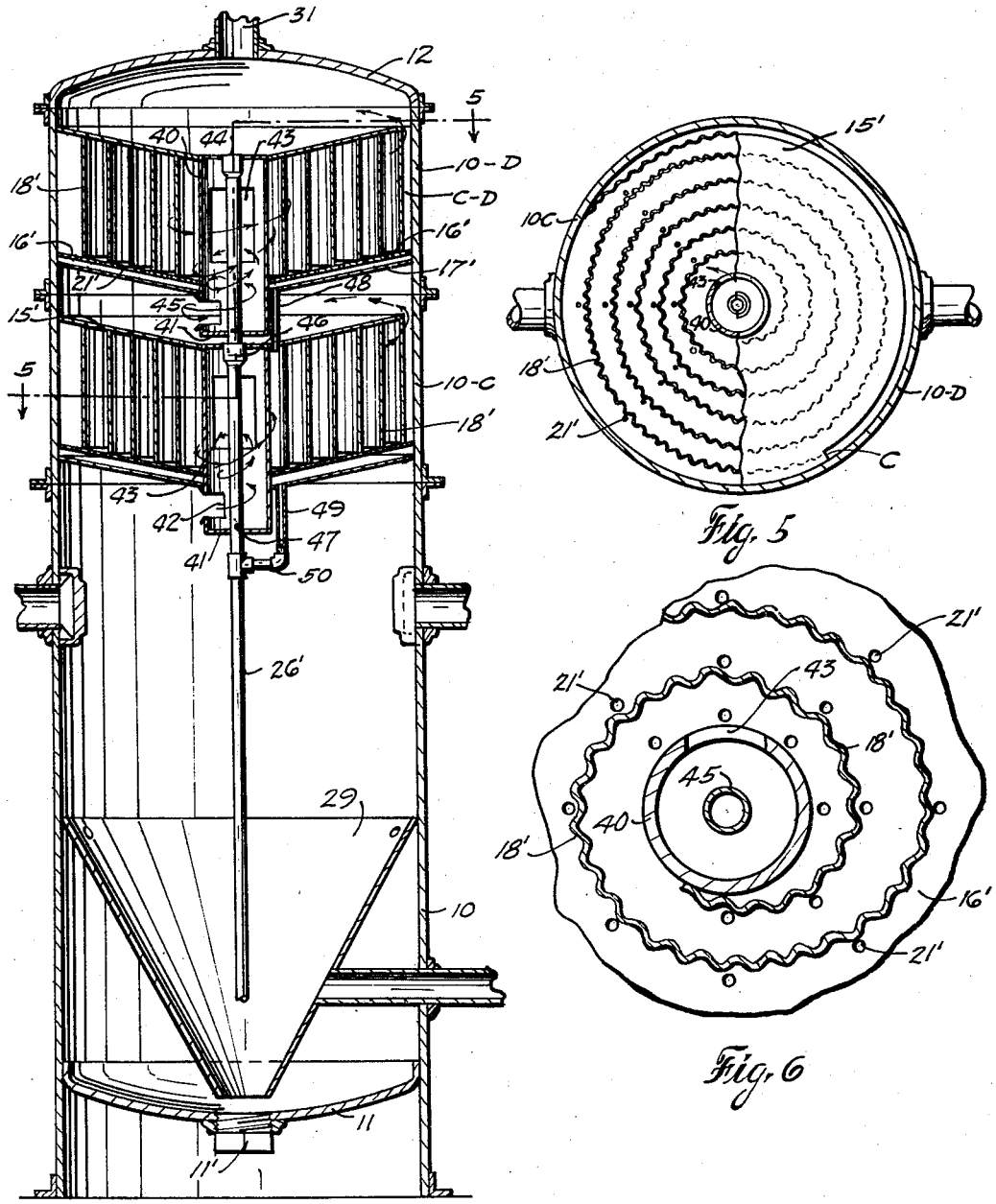

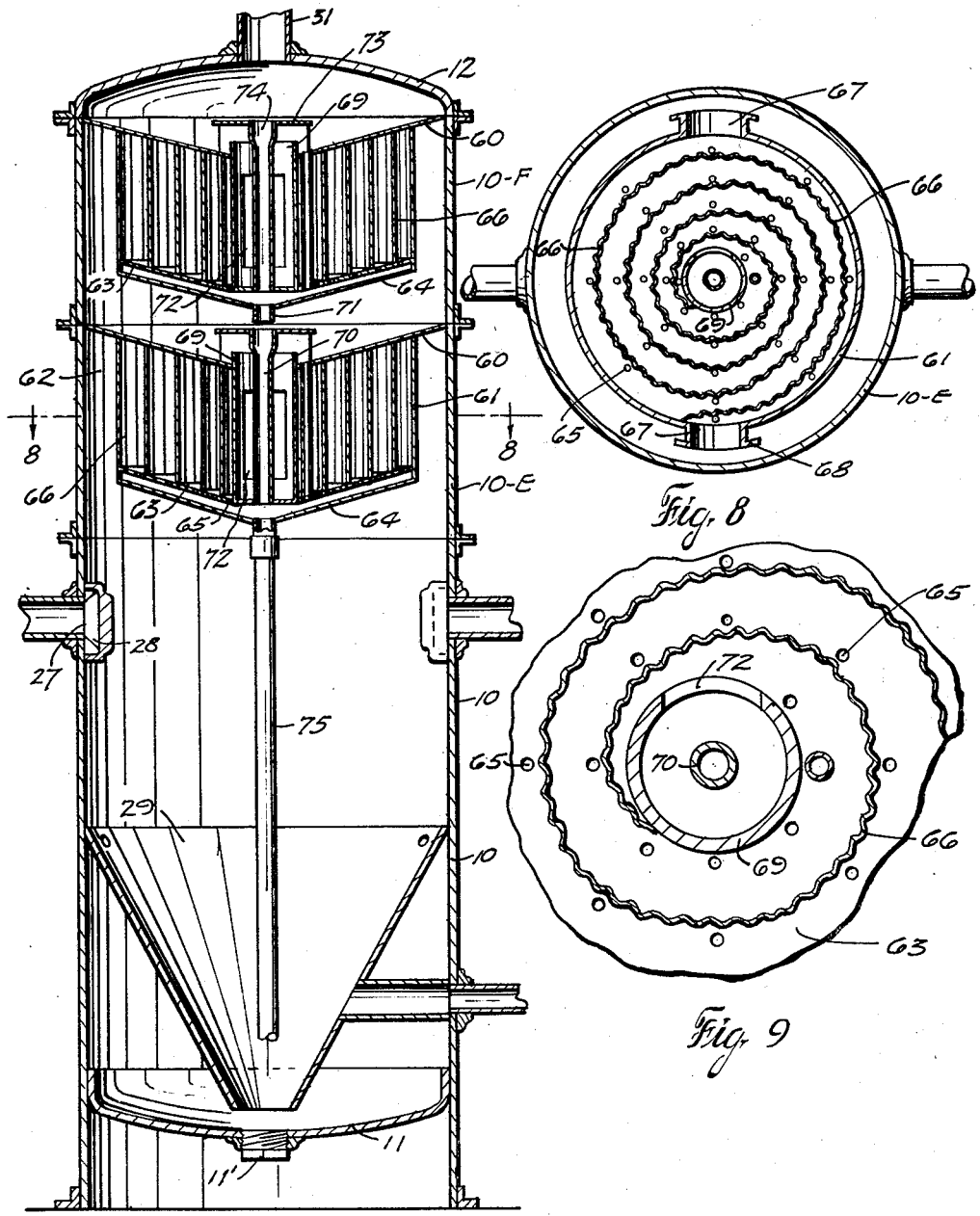

1,970,783

UNITED STATES PATENT OFFICE 1,970,783

FLUID AND LIQUID SEPARATION

Jay P. Walker, Tulsa, Okla., assignor of forty per cent to Guy O. Marchant and six per cent to C. G. Wells, both of Tulsa, Okla.

Application February 2, 1931, Serial No. 513,012

3 Claims. (Cl. 183—2.7)

This invention relates to new and useful improvements in fluid and liquid separation.

One object of the invention is to provide means for introducing a liquid and fluid influent into a container and conducting it helically and then conducting it spirally to separate the liquids from the gaseous fluids.

A further object of the invention is to provide means for introducing a liquid and fluid influent into a container and spreading it helically on the wall of the container, whereby a preliminary separation is performed and then conducting the more gaseous fluids spirally to further scrub out liquids.

Another object of the invention is to provide means for carrying the more gaseous fluids through successive spiral stages and scrubbing them against upright walls during such travel, whereby liquids are extracted.

Still another object of the invention is to provide a spiral conductor having undulating upright walls, whereby the passage of the fluids is sufficiently retarded to scrub out additional liquids without interfering with the progress of the separation and whereby amplified scrubbing surfaces are provided.

A further object of the invention is to provide spiral scrubbers in the form of units, whereby two or more may be assembled in superposed and inter-connecting relation in a separator container.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a vertical sectional view of a separator constructed in accordance with the invention, Figure 2 is a horizontal cross-sectional view taken on the line 2—2 of Figure 1, Figure 3 is an enlarged view of the central portion of Figure 2, Figure 4 is a view similar to Figure 1, showing another form in which the invention may be carried out, Figure 5 is a horizontal cross-sectional view taken on the line 5—5 of Figure 4, Figure 6 is an enlarged view of the central portion of Figure 5, and Figures 7, 8 and 9 are views similar respectively to Figures 1, 2 and 3 and illustrating further modification of structure.

In the drawings the numeral 10 designates an upright tank having a false bottom 11 and a crowned top 12. The upper portion of the tank is formed of cylindrical sections or units 10—A and 10—B, each having annular top flanges 13 and annular bottom flanges 14. The sections are secured together by uniting the top flange 13 of one with the bottom flange 14 of the next highest section. The bottom flange 14 of the lowest section is secured to an annular flange 14' on the body of the tank, while the flange 13 of the upper section is secured to an annular flange 13' surrounding the top 12. The flanges may be united by welding, bolting or other means.

It will be seen that as many sections as are desired may be included in the tank. Each section includes an inwardly inclined or conical top plate 15 and a complementary bottom composed of spaced companion plates 16 and 17 respectively. The upper plate 16 supports the bottom of a spiral baffle 18 which is secured at its top to the underside of the top plate 15. Each section with its spiral baffle constitutes a spiral baffle unit.

The baffle 18 has its outer vertical edge secured to the inner wall of the tank section, as is indicated at A in Figure 2, while the inner end of the baffle is secured to a central cylindrical flue 19. Beginning at the wall of the tank the deflector forms a spiral or volute passage or duct extending continuously inward to the flue 19 which has a vertical side opening 20 (Figure 3) into which said passage or duct discharges.

The bottom plates 16 and 17 are cut away contiguous to the baffle from the point A to a point B (Figure 2), which provides an entrance whereby the gaseous fluids may rise into the baffle direct. While the baffle 18 may have a smooth upright wall, it is preferable to corrugate it or otherwise give it an undulating contour, whereby the surface contact of the fluids is amplified and their passage sufficiently retarded to more effectually scrub out the liquids. The plate 16 has apertures 21 on the outer sides of the convolutions of the baffle for draining the extracted liquids.

Each flue 19 is open at each end and the upper end extends above the top plate 15. A drain tube 22 extends from the top 15 down the outer side of the flue through the bottom plate 16. A drain pipe 23 extends axially in each flue, but terminates short of the bottom plate 17. Co-axially with the pipe 23 a nipple 24 depends from the bottom plate 17. The upper end of each pipe 23 has an enlarged socket 25 for receiving the nipple of the next highest unit. An extension pipe 26 is connected to the nipple 24 of the lowest section and extends to the lower end of the tank.

At mid-height the tank 10 is provided with opposite inlets 27 for admitting the influent to be separated. These inlets are covered on the inside of the tank by diverters 28 secured to the inner wall. Each diverter is open on one vertical side only and is flared toward the said opening. By this arrangement the influent is turned and directed circumferentially on the inner wall of the tank.

The directing of the influent onto the inner wall of the tank causes it to spread thereon, which tends to release the lighter gaseous constituents. Owing to the flared diverters there is a tendency therein to effect an initial separation of the constituents according to their specific gravities—the heavier liquids segregating downwardly and the gaseous fluids working upwardly.

In the lower end of the tank a conical hopper 29 is secured. The upper flared edge of the hopper is in contact with the inner wall of the tank, while the lower reduced end discharges immediately over the false bottom 11 and its cleanout plug 11'. The purpose of this hopper is to guide the sand and discharge it below the hopper where it may deposit on the bottom 11. A liquid discharge pipe 30 leads from an elevated point on the hopper through the wall of the tank. A gas outlet pipe 31 is connected in the center of the top 12.

This invention has particularly to do with the separation of liquids from gaseous fluids and where used as an oil and gas separator has been found to be very effective. Crude oil as it comes from the well, where there is gas, does not flow as a solid stream, but more in the nature of a gas mixture or mist—the proportions of gas and liquid varying from an excessive amount of liquid to an excessive amount of gas. The gas tends to rise and the liquids to settle, but owing to the high pressure and velocity the liquids are held in suspension while being conducted through the pipes from the well to the separator, which usually is within fifty feet of the well.

It will be apparent that when the influent is abruptly turned in the diverter 28 and then discharged through the flaring opening, the constituents will be given a brief opportunity in which to segregate, the liquids starting downward and the gaseous fluids starting upward. The circumferential direction will cause the constituents of the influent to spread on the inner wall of the tank. The inlets 27 are at such height as to permit the liquids to travel circumferentially a sufficient distance to free the gaseous fluids before accumulating in the hopper 29.

The gaseous fluids which rise from the diverters 28 travel up the inner wall of the tank in a helical path and seek the entrance A—B of the lower unit or section 10—A. The conical bottom of the unit tends to deflect the fluids into said entrance. No claim is made to the diverters per se or the flowing of the fluids and liquids in helical paths, as these are the subject matter of previous inventions.

The gaseous fluids entering the lower unit 10—A will be flowing under considerable velocity and will be laden with liquid globules. These fluids seeking an outlet will follow the spiral baffle 18, thus taking a horizontal spiral or volute path inwardly. Upon contact with the undulations or corrugations of the baffle, the flow of the fluids will be retarded and the area of contact will be increased, with the result that liquids will be scrubbed out of the fluids. It is obvious that the gaseous fluids are constantly moving toward an outlet from an inlet. There is a constant pressure behind the flowing fluids and their pressure must gradually reduce toward their outlet, otherwise they would not flow. The spiral paths gradually increase in cubical content from inlet to outlet, therefore, as the fluids flow progressively from inlet to outlet, there is constantly more space to fill. This, coupled with the frictional contact of the gases in passing along the baffles, results in a frictional loss, whereby the fluids constantly undergo expansion, as well as a drop in pressure.

Extracted liquids will run the vertical wall of the deflector and escape through the openings 21. Liquids caught between the bottom plates will be discharged from the nipple 24 into the pipe 26 and conducted to the bottom of the tank. The spirally moving fluids upon reaching the center of the lower unit will escape into the flue 19 through the opening 20 and pass upward therein.

Fluids which escape from the top of the lower flue 19 will be deflected outwardly by the conical bottom 17 of the superposed unit 10—B so as to enter the latter through its entrance A—B. The separating operation in the second unit will be the same as in the first, except that the fluid will not be so rich in liquid content. By the time the fluids reach the second flue 19, substantially all of the liquids will have been extracted and only gas will remain to escape through the pipe 31. Where necessary, additional units could be included in the tank.

In Figures 4, 5 and 6 I have illustrated a form of unit which operates reversely to the units 10—A and 10—B. These units 10—C and 10—D are similar to the other units and each have a top plate 15' and bottom plates 16' and 17', the plate 16' having drain holes 21'. The baffle 18' is similar except that it extends spirally outward from a central flue 40 and instead of the entrance A—B, an exit C—D is provided at the outer edge.

The flue 40 depends below the bottom of the unit and has its bottom 41 closed. The extension has an entrance opening 42 through which the gaseous fluids are admitted to the flue. The fluids escape from the flue through an outlet 43 in its side, a top closure 44 preventing upward passage. Drain pipes 45 extend axially through the flues and have sockets 46 and drain ports 47. A drain tube 48 extends from the upper unit to the lower unit and a drain tube 49 extending from the lower unit is connected with the extension pipe 26' by an elbow 50. The gaseous fluids travel spirally outwardly instead of inwardly.

Figures 7, 8 and 9 illustrate still another form in which the invention may be carried out. Each unit 10—E and 10—F includes a conical top plate 60 having its outer edge continuously secured to the inner wall of the tank section. A cylindrical shell 61 depends from the top and is considerably less in diameter than the tank, thus providing an annular vertical space or scrubbing chamber 62 between the tank wall and the shell.

The bottom of the shell is closed by conical bottom plates 63 and 64, the plate 63 having drain ports 65. An inwardly directed spiral baffle 66 is mounted within the shell and opposite inlets 67 admit the gaseous fluids to the baffle. Each inlet includes an outwardly projecting flanged collar 68. Liquids clinging to the outer surface of the shell would be deflected from the inlets by the collars.

This form of unit has a central flue 69 similar to the flue 19 and is likewise provided with an axial drain pipe 70 similar to the pipe 23 and a drain nipple 71 similar to the nipple 24. The flue has an entrance opening 72. Above each flue is a circular deflector 73 and the pipe 70 has a socket 74 suspended from this deflector. The socket of the lower unit is under the nipple 71 of the upper unit and the lower nipple is connected to an extension drain pipe 75. The gaseous fluids entering the shells are carried inwardly by the spiral baffle and escape from the flues. The deflectors 73 act to divert the fluids outwardly.

Various changes in the size and shape of the different parts, as well as modifications and alterations, may be made within the scope of the appended claims.

Having illustrated and described preferred forms of the invention, what I claim is:

1. An oil and gas separator including, an upright tank having an influent inlet at mid-height, a pair of transverse partitions in the upper portion of the tank above the inlet inclined toward the center of said tank, oil drains extending from the central portions of said inclined partitions, and spiral baffles under each partition having inclined drains connected with the first named drain and open to receive the gaseous fluids.

2. An oil and gas separator including, an upright tank having an influent inlet at mid-height, a pair of transverse partitions in the upper portion of the tank above the inlet inclined toward the center of said tank, oil drains extending from the central portions of said inclined partitions, and spiral baffles under each partition having inclined drains connected with the first named drain and open to receive the gaseous fluids, the bottom of the upper baffle being spaced above the lower partition to provide a transverse passage therebetween for the flow of the gaseous fluids, each partition constituting a drain for liquids scrubbed from the gaseous fluids.

3. An oil and gas separator including, an upright tank having an influent inlet at mid-height, partitions spaced one above the other in said tank above the influent inlet and each inclined toward its center, spiral baffles depending from the partitions, each partition being spaced at one point from the wall of the tank and in contact therewith at another point, inclined drains at the bottoms of the baffles, upright flues in the centers of the baffles extending below the same and having inlets below said baffles and outlets within said baffles, and a drain conductor connected with the partitions and the baffle drains at their central points and extending to the bottom portion of the tank.

JAY P. WALKER.